US011623891B2

(12) United States Patent
Toussaint

(10) Patent No.: US 11,623,891 B2
(45) Date of Patent: Apr. 11, 2023

(54) PROCESS FOR FIREPROOFING MATERIALS

(71) Applicant: ISOLFEU-CREATION, Metz (FR)

(72) Inventor: Philippe Toussaint, Queven (FR)

(73) Assignee: ISOLFEU-CREATION, Metz (FR)

( * ) Notice: Subject to any disclaimer, the term of this patent is extended or adjusted under 35 U.S.C. 154(b) by 34 days.

(21) Appl. No.: 17/269,134

(22) PCT Filed: Dec. 7, 2020

(86) PCT No.: PCT/EP2020/084956
§ 371 (c)(1),
(2) Date: Feb. 17, 2021

(87) PCT Pub. No.: WO2021/111012
PCT Pub. Date: Jun. 10, 2021

(65) Prior Publication Data

US 2022/0127196 A1 Apr. 28, 2022

(30) Foreign Application Priority Data

Dec. 5, 2019 (FR) ....................................... 1913832

(51) Int. Cl.

| | |
|---|---|
| ***C04B 28/00*** | (2006.01) |
| ***C04B 40/00*** | (2006.01) |
| ***C04B 111/00*** | (2006.01) |
| ***C04B 111/28*** | (2006.01) |

(52) U.S. Cl.
CPC ........ *C04B 28/006* (2013.01); *C04B 40/0025* (2013.01); *C04B 2111/00534* (2013.01); *C04B 2111/28* (2013.01)

(58) Field of Classification Search
CPC .............. C04B 28/006; C04B 40/0025; C04B 2111/00534; C04B 2111/28; Y02P 40/10
See application file for complete search history.

(56) References Cited

U.S. PATENT DOCUMENTS

2014/0005302 A1 1/2014 Briand et al.

FOREIGN PATENT DOCUMENTS

| | | | |
|---|---|---|---|
| CN | 110078426 A * | 8/2019 |
| EP | 2875924 A1 | 5/2015 |
| EP | 2451657 | 3/2017 |
| FR | 2659963 | 9/1991 |
| FR | 2680194 | 2/1993 |
| WO | 2011/003918 A1 | 1/2011 |
| WO | 2013/148846 A1 | 10/2013 |
| WO | 2015/062860 A1 | 5/2015 |
| WO | 2015/082513 A1 | 6/2015 |
| WO | 2015/082585 A1 | 6/2015 |

OTHER PUBLICATIONS

PCT Written Opinion and Search Report mailed in related PCT/EP2020/084956 dated Feb. 25, 2021. Search report translated.
Written Opinion and Search Report issued in connection with related French Patent Application No. 1913832 dated Oct. 12, 2020.
Canadian Office Action issued in connection with related Canadian Patent Application No. 3,113,652 dated Jul. 5, 2022.
French Office Action issued in connection with related French Patent Application No. FR1913832 dated Jul. 1, 2022 with English translation.

* cited by examiner

*Primary Examiner* — Anthony J Green
(74) *Attorney, Agent, or Firm* — Dentons US LLP

(57) ABSTRACT

A process for fireproofing materials, using the following steps:
a) placing a material in contact with a viscoelastic suspension obtained by mixing a pozzolanic material with an alkaline activation solution having at least one soluble metal hydroxide;
b) geopolymerizing the viscoelastic suspension;
c) obtaining a fireproof material with a geopolymer.

18 Claims, No Drawings

PROCESS FOR FIREPROOFING MATERIALS

CROSS-REFERENCE TO RELATED PATENT APPLICATIONS

This patent application is the 35 U.S.C. 371 national stage of International Patent Application PCT/EP2020/084956 filed 7 Dec. 2020; which claims the benefit of priority to FR 19/13832 filed 5 Dec. 2019, which is incorporated by reference herein for all purposes.

The invention relates to a process for fireproofing materials.

The invention also relates to fireproofing materials comprising a geopolymer.

PRIOR ART

Fireproofing of materials is commonly performed using flame retardant additives including environmentally harmful and toxic compounds such as brominated or chlorinated compounds.

There is a growing demand for the use of non-toxic and environmentally friendly alternative additives.

Geopolymers derived from inorganic chemistry represent an ideal alternative as they have intrinsic flame retardant properties and do not require the use of toxic and environmentally harmful components for their manufacture. These geopolymers are prepared from a pozzolanic material such as metakaolin which, when mixed with an activation solution comprising in particular an alkaline base and at least one silicate, will dissolve, thus forming a viscoelastic suspension. This viscoelastic suspension will subsequently polymerize upon repose, causing it to harden and thus form a geopolymer.

This polymerization reaction is a geopolymerization reaction in that inorganic polymers are formed during the reaction. These inorganic polymers are essentially composed of silico-oxide units (—Si—O—Si—O—), silico-aluminate (—Si—O—Al—O—), ferro-silico-aluminate (—Fe—O—Si—O—Al—O—) or also aluminum-phosphate (—Al—O—P—O—).

Patent FR2659963 discloses geopolymeric materials designed for producing fire resistant coatings.

Patent FR 2680194 discloses a process for thermal insulation of a building element using an organic geopolymer mineral binder.

Patent EP2451758 discloses building units made from geopolymeric cement.

DETAILED DESCRIPTION OF THE INVENTION

The invention relates to a process for fireproofing materials, comprising the following steps:

a) placing a material in contact with a viscoelastic suspension obtained by mixing a pozzolanic material with an alkaline activation solution comprising at least one soluble metal hydroxide;

b) geopolymerizing of said viscoelastic suspension; and c) obtaining a fireproofed material comprising a geopolymer.

The term "viscoelastic" is understood to mean the property of materials undergoing deformation which exhibit both viscous and elastic characteristics. Viscous materials resist shear flow and exhibit strain that increases linearly with time when stress is applied. Elastic materials deform when stressed, and quickly return to their original state when the stress is removed. In rheology, the behavior of a linear viscoelastic material is thus intermediate between that of an ideal elastic solid symbolized by a module E (or G) spring and that of a Newtonian viscous liquid symbolized by a viscosity damper. The elasticity of a material reflects its ability to conserve and restore energy after deformation. The viscosity of a material reflects its ability to dissipate energy.

The viscoelastic behavior of said suspension is demonstrated during aging, that is to say when the suspension approaches hardening or more precisely the stage where it becomes viscoplastic. The rheological study of said viscoelastic suspension confirms the existence of a flow threshold at the start of the measurement, when it is at rest. It also shows that when subjected to an increasing shear rate, the viscosity decreases. The rheological behavior of said viscoelastic suspension has a thixotropic phase defined by a yield point and then has a rheo-thinning profile. After several hours of pot life, this behavior becomes rheo-thickening. In the first hours after its manufacture, the rheology of the binder is of the non-Newtonian and viscoelastic type.

The term, "fireproofing", is understood to mean the treatment of a material or a material to reduce its flammability.

In one embodiment, the process for fireproofing materials according to the invention is characterized in that the at least one soluble metal hydroxide is an alkali metal hydroxide.

Preferably, the at least one alkali metal hydroxide is selected from the group consisting of sodium hydroxide and potassium hydroxide, alone or in combination.

In one embodiment, the process to fireproof materials according to the invention is characterized in that said alkaline activation solution further comprises at least one silicate.

In one embodiment, the process for fireproofing materials according to the invention is characterized in that the at least one silicate comprises a soluble alkali metal hydroxide.

Preferably, the at least one silicate comprising a soluble alkali metal oxide is selected from the group consisting of sodium silicate and potassium silicate, alone or in combination.

In one embodiment, the process to fireproof materials according to the invention is characterized in that the silicate concentration of said viscoelastic suspension is between 5% and 25% by mass.

In one embodiment, the process to fireproof materials according to the invention is characterized in that the silicate concentration of said viscoelastic suspension is between 5% and 20% by mass.

In one embodiment, the process to fireproof materials according to the invention is characterized in that the silicate concentration of said viscoelastic suspension is between 10% and 15% by mass.

In one embodiment, the process to fireproof materials according to the invention is characterized in that the pozzolanic material concentration of said viscoelastic suspension is between 15% and 50% by mass.

In one embodiment, the process to fireproof materials according to the invention is characterized in that the pozzolanic material concentration of said viscoelastic suspension is between 20% and 45% by mass.

In one embodiment, the process to fireproof materials according to the invention is characterized in that the pozzolanic material concentration of said viscoelastic suspension is between 25% and 40% by mass.

In one embodiment, the process to fireproof materials according to the invention is characterized in that the pozzolanic material is metakaolin.

The term, “metakaolin”, is understood to mean a thermally dehydroxylated kaolinite clay. In other words, it is a dehydroxylated alumina silicate of general composition $Al_2O_3$, $2SiO_2$.

In one embodiment, the process to fireproof materials according to the invention is characterized in that the concentration of at least one soluble metal hydroxide of said viscoelastic suspension is between 2% and by 10% by mass.

In one embodiment, the process to fireproof materials according to the invention is characterized in that the concentration of at least one soluble metal hydroxide of said viscoelastic suspension is between 2% and by 8% by mass.

In one embodiment, the process to fireproof materials according to the invention is characterized in that the concentration of at least one soluble metal hydroxide of said viscoelastic suspension is between 4% and by 8% by mass.

In one embodiment, the process to fireproof materials according to the invention is characterized in that said alkaline activation solution further comprises at least one hydrophobic agent selected from the group consisting of siliconates, silanes, siloxanes, and mixtures thereof.

In one embodiment, the process to fireproof materials according to the invention is characterized in that the concentration of the at least one hydrophobic agent of said viscoelastic suspension is between 1% and 7% by mass.

In one embodiment, the process to fireproof materials according to the invention is characterized in that the concentration of the at least one hydrophobic agent of said viscoelastic suspension is between 1% and 5% by mass.

In one embodiment, the process to fireproof materials according to the invention is characterized in that the concentration of the at least one hydrophobic agent of said viscoelastic suspension is between 2% and 4% by mass.

In one embodiment, the process to fireproof materials according to the invention is characterized in that said alkaline activation solution further comprises at least one surfactant.

In one embodiment, the process to fireproof materials according to the invention is characterized in that said alkaline activation solution further comprises the at least one anionic surfactant selected from the group consisting of C8-C18-alkyl sulphates, C8-C18-alkyl ether sulfates, C8-C18-alkyl aryl sulfonic acids, C8-C18 fatty acids and mixtures thereof.

The term, “anionic surfactant”, is understood to mean a surfactant which releases a negative charge in aqueous solution. The class of anionic surfactants is widely described in the literature.

In one embodiment, the process to fireproof materials according to the invention is characterized in that the concentration of the at least one surfactant of said viscoelastic suspension is between 0.005% and 0.15% by mass.

In one embodiment, the process to fireproof materials according to the invention is characterized in that the concentration of the at least one surfactant of said viscoelastic suspension is between 0.005% and 0.075% by mass.

In one embodiment, the process to fireproof materials according to the invention is characterized in that the concentration of the at least one surfactant of said viscoelastic suspension is between 0.005% and 0.05% by mass.

In one embodiment, the process to fireproof materials according to the invention is characterized in that the $SiO_2/Al_2O_3$ ratio of said viscoelastic suspension is between 2 and 5.

In one embodiment, the process to fireproof materials according to the invention is characterized in that the $SiO_2/Al_2O_3$ ratio of said viscoelastic suspension is between 2.5 and 4.5.

In one embodiment, the process to fireproof materials according to the invention is characterized in that the $SiO_2/Al_2O_3$ ratio of said viscoelastic suspension is between 3 and 4.

In one embodiment, the process to fireproof materials according to the invention is characterized in that the density of the viscoelastic suspension brought into contact with said material is between 500 and 3000 $Kg/m^3$.

In one embodiment, the process to fireproof materials according to the invention is characterized in that the density of the viscoelastic suspension brought into contact with said material is between 750 and 2500 $Kg/m^3$.

In one embodiment, the process to fireproof materials according to the invention is characterized in that the density of the viscoelastic suspension brought into contact with said material is between 1000 and 2000 $Kg/m^3$.

In one embodiment, the process to fireproof materials according to the invention is characterized in that the density of the viscoelastic suspension brought into contact with said material is between 1250 and 1750 $Kg/m^3$.

In one embodiment, the method of fireproofing material according to the invention is characterized in that the manner of contact is performed by a technique selected from the group consisting of impregnation, mixing, coating or layering.

The term, “impregnation”, is understood to mean the action of penetrating a substance into a material by spreading or diffusing it therein.

The term, “mixture”, is understood to mean the action of mixing, of putting together various substances, of bringing them together into a whole.

The term, “coating or layering”, is understood to mean the action of coating the surface of a support with a product. The application of the product to the surface of the support may be performed in one or more successive layers. It is also possible after coating to superimpose another surface upon the coated surface which can also be coated in turn and the process may be repeated as many times as necessary. This technique makes it possible in particular to manufacture composite materials.

In one embodiment, the process to fireproof materials according to the invention is characterized in that said material is of a shape selected from the group consisting of blocks, fragments, filaments or fibers, particles, alone or in combination.

The term, “block”, is understood to mean a compact mass of something, in a single piece, little or no work.

The term, “fragments”, is understood to mean pieces of a broken or torn thing, debris.

The term, “fibers or filaments”, is understood to mean an element of elongated or extended shape.

The term, “particles”, is understood to mean very small parts of something.

In one embodiment, the process to fireproof materials according to the invention is characterized in that said material is selected from the group consisting of organic and inorganic materials, alone or in combination.

The term, “organic”, is understood to mean, that which comes directly or indirectly from living tissues or organisms, which always contain carbon. This definition includes organic molecules resulting from petrochemicals by cracking hydrocarbons.

The term, "inorganic", is understood to mean mineral consistency.

In one embodiment, the process to fireproof materials according to the invention is characterized in that said material is permeable or impermeable.

In one embodiment, the process to fireproof materials according to the invention is characterized in that placing said material in contact with said viscoelastic suspension is performed by impregnation.

In one embodiment, the process to fireproof materials according to the invention is characterized in that said impregnated material is permeable.

In one embodiment, the process to fireproof materials according to the invention is characterized in that said impregnated permeable material is in an organic material.

In one embodiment, the process to fireproof materials according to the invention is characterized in that said impregnated permeable material is in an inorganic material.

In one embodiment, the process to fireproof materials according to the invention is characterized in that said impregnated permeable material is in block form.

In one embodiment, the process to fireproof materials according to the invention is characterized in that said impregnated permeable material in block form is in an organic material.

In one embodiment, the process to fireproof materials according to the invention is characterized in that said impregnated permeable material in block form in organic materials is a foam.

In one embodiment, the process to fireproof materials according to the invention is characterized in that said impregnated permeable material in block form in organic materials is a polyurethane foam.

In one embodiment, the process to fireproof materials according to the invention is characterized in that said impregnated permeable material is in block form in an inorganic material.

In one embodiment, the process to fireproof materials according to the invention is characterized in that said impregnated permeable material is in fragmented form.

In one embodiment, the process to fireproof materials according to the invention is characterized in that said impregnated permeable material is in fragmented form in organic materials.

In one embodiment, the process to fireproof materials according to the invention is characterized in that said impregnated permeable material is in fragmented form in inorganic materials.

In one embodiment, the process to fireproof materials according to the invention is characterized in that said impregnated permeable material is in the form of filaments or fibers.

In one embodiment, the process to fireproof materials according to the invention is characterized in that said impregnated permeable material is in the form of organic filaments or fibers.

In one embodiment, the process to fireproof materials according to the invention is characterized in that said impregnated permeable material is in the form of inorganic filaments or fibers.

In one embodiment, the process to fireproof materials according to the invention is characterized in that placing said material in contact with said viscoelastic suspension is performed by coating or layering.

In one embodiment, the process to fireproof materials according to the invention is characterized in that the viscoelastic suspension is coated to a gram weight of 50 to 1500 g/m2.

In one embodiment, the process to fireproof materials according to the invention is characterized in that the viscoelastic suspension is coated to a gram weight of 150 to 1000 g/m2.

In one embodiment, the process to fireproof materials according to the invention is characterized in that the viscoelastic suspension is coated to a gram weight of 250 to 900 g/m2.

In one embodiment, the process to fireproof materials according to the invention is characterized in that said coated material is in block form.

In one embodiment, the process to fireproof materials according to the invention is characterized in that said coated material is in block form in inorganic materials.

In one embodiment, the process to fireproof materials according to the invention is characterized in that said coated material is in block form in organic materials.

In one embodiment, the process to fireproof materials according to the invention is characterized in that said coated material is in fragmented form.

In one embodiment, the process to fireproof materials according to the invention is characterized in that said coated material is in fragmented form in organic materials.

In one embodiment, the process to fireproof materials according to the invention is characterized in that said coated material is in fragmented form in inorganic materials.

In one embodiment, the process to fireproof materials according to the invention is characterized in that said coated material is in particulate form.

In one embodiment, the process to fireproof materials according to the invention is characterized in that said coated material is in particulate form in organic materials.

In one embodiment, the process to fireproof materials according to the invention is characterized in that said coated material is in particulate form in inorganic materials.

In one embodiment, the process to fireproof materials according to the invention is characterized in that said coated material is in the form of fibers or filaments.

In one embodiment, the process to fireproof materials according to the invention is characterized in that said coated material is in the form of fibers or filaments in organic materials.

In one embodiment, the process to fireproof materials according to the invention is characterized in that said coated material is in the form of fibers or filaments in inorganic materials.

In one embodiment, the process to fireproof materials according to the invention is characterized in that placing said material in contact with said viscoelastic suspension is performed by mixing.

In one embodiment, the process to fireproof materials according to the invention is characterized in that said mixed material is in fragmented form.

In one embodiment, the process to fireproof materials according to the invention is characterized in that said mixed material is in fragmented form in organic materials.

In one embodiment, the process to fireproof materials according to the invention is characterized in that said mixed material is in fragmented form in inorganic materials.

In one embodiment, the process to fireproof materials according to the invention is characterized in that said mixed material is in particulate form.

In one embodiment, the process to fireproof materials according to the invention is characterized in that said mixed material is in particulate form in organic materials.

In one embodiment, the process to fireproof materials according to the invention is characterized in that said mixed material is in particulate form in inorganic materials.

In one embodiment, the process to fireproof materials according to the invention is characterized in that said mixed material is in the form of fibers or filaments.

In one embodiment, the process to fireproof materials according to the invention is characterized in that said coated material is in the form of fibers or filaments in organic materials.

In one embodiment, the process to fireproof materials according to the invention is characterized in that said mixed material is in the form of fibers or filaments in inorganic materials.

The organic materials used in the fireproofing process according to the present invention, whatever their forms, are advantageously bio-sourced.

The term, "bio-sourced", means materials derived from renewable organic matter (biomass), of plant or animal origin. They may be used as a raw material in construction and decoration products, stationary furniture and as a construction material in a building.

A non-limiting list of bio-based materials are wood, cork, straw, hemp, cellulose wadding, recycled textiles, animal wool, glass wool, rock wool, polystyrene, cereal husks, miscanthus, flax, thatch, meadow grass, various passive waste such as, for example, feathers and grindings from industrial and/or agri-food sources, etc.

Thus, at the end of the process, a completely natural flame-retardant material is obtained without any chemical additives that are problematic for health.

In one embodiment, the process to fireproof materials according to the invention is characterized in that it comprises a shaping step between step a) and b).

In one embodiment, the method of fireproofing material according to the invention is characterized in that the shaping step is carried out by a technique selected from the group consisting of pressing, molding, extrusion.

The term, "pressing", is understood to mean a press shaping process.

The term, "molding", is understood to mean a process of obtaining an object by filling a mold with a substance which retains the shape of the mold after hardening or solidification.

The term, "extrusion", is understood to mean a shaping process which consists in pushing the material through a die.

In one embodiment, the process to fireproof materials according to the invention is characterized in that the shaping step is carried out by pressing.

In one embodiment, the process to fireproof materials according to the invention is characterized in that the shaping step is carried out by molding.

In one embodiment, the process to fireproof materials according to the invention is characterized in that the shaping step is carried out by extrusion.

In one embodiment, the process to fireproof materials according to the invention is characterized in that it comprises a step to eliminate the solvent between step b) and c).

In one embodiment, the process to fireproof materials according to the invention is characterized in that the step to eliminate the solvent is performed by drying.

In one embodiment, the process to fireproof materials according to the invention is characterized in that solvent is water.

In one embodiment, the process to fireproof materials according to the invention is characterized in that prior to step a), it comprises manufacture of the viscoelastic suspension comprising the following steps:

w) placing in an aqueous solution at least one soluble metal hydroxide;

x) agitating the aqueous solution and obtaining an activation solution;

y) introducing a pozzolanic material into said activation solution; and z) mixing the activation solution with the pozzolanic material and obtaining a viscoelastic suspension.

In one embodiment, the process for fireproofing materials according to the invention is characterized in that the at least one soluble metal hydroxide is an alkali metal hydroxide in step w).

Preferably, the at least one alkali metal hydroxide is selected from the group consisting of sodium hydroxide and potassium hydroxide, alone or in combination.

In one embodiment, the process to fireproof materials according to the invention is characterized in that the molar concentration of hydroxide ions of the at least one soluble metal hydroxide placed in the aqueous solution is between 5 and 10 M.

In one embodiment, the process to fireproof materials according to the invention is characterized in that the molar concentration of hydroxide ions of the at least one soluble metal hydroxide placed in the aqueous solution is between 6 and 9 M.

In one embodiment, the process to fireproof materials according to the invention is characterized in that the molar concentration of hydroxide ions of the at least one soluble metal hydroxide placed in the aqueous solution is between 7 and 8 M.

In one embodiment, the process to fireproof materials according to the invention is characterized in that the soluble metal hydroxide concentration of said activation solution is between 5% and 20% by mass.

In one embodiment, the process to fireproof materials according to the invention is characterized in that the soluble metal hydroxide concentration of said activation solution is between 5% and 15% by mass.

In one embodiment, the process to fireproof materials according to the invention is characterized in that the soluble metal hydroxide concentration of said activation solution is between 5% and 10% by mass.

In one embodiment, the process to fireproof materials according to the invention is characterized in that in step w), at least one silicate is added.

In one embodiment, the process to fireproof materials according to the invention is characterized in that in step w), at least one silicate comprising a soluble alkali metal oxide is added.

Said silicate comprising a soluble alkali metal oxide is of formula $SiO_2$, $M_2O$, $H_2O$ with M being an alkali metal.

In one embodiment, the process to fireproof materials according to the invention is characterized in that the $M_2O/SiO_2$ ratio of said activation solution is between 0.1 and 0.4.

In one embodiment, the process to fireproof materials according to the invention is characterized in that the $M_2O/SiO_2$ ratio of said activation solution is between 0.15 and 0.35.

In one embodiment, the process to fireproof materials according to the invention is characterized in that the $M_2O/SiO_2$ ratio of said activation solution is between 0.2 and 0.3.

Preferably, the at least one silicate comprising a soluble alkali metal oxide is selected from the group consisting of sodium silicate and potassium silicate, alone or in combination.

In one embodiment, the process to fireproof materials according to the invention is characterized in that the silicate concentration of said activation solution is between 10% and 40% by mass.

In one embodiment, the process to fireproof materials according to the invention is characterized in that the silicate concentration of said activation solution is between 10% and 30% by mass.

In one embodiment, the process to fireproof materials according to the invention is characterized in that the silicate concentration of said activation solution is between 15% and 25% by mass.

In one embodiment, the process to fireproof materials according to the invention is characterized in that in step w), at least one hydrophobic agent is added.

In one embodiment, the process to fireproof materials according to the invention is characterized in that the at least one hydrophobic agent is selected from the group consisting of siliconates, silanes, siloxanes and mixtures thereof.

In one embodiment, the process to fireproof materials according to the invention is characterized in that the concentration of the at least one hydrophobic agent of said activation solution is between 1% and 10% by mass.

In one embodiment, the process to fireproof materials according to the invention is characterized in that the concentration of the at least one hydrophobic agent of said activation solution is between 2% and 8% by mass.

In one embodiment, the process to fireproof materials according to the invention is characterized in that the concentration of the at least one hydrophobic agent of said activation solution is between 3% and 6% by mass.

In one embodiment, the process to fireproof materials according to the invention is characterized in that in step w), at least one surfactant is added.

In one embodiment, the process to fireproof materials according to the invention is characterized in that the at least one surfactant is an anionic surfactant selected from the group constituted by the group consisting of C8-C18-alkyl sulfates, C8-C18-alkyl ether sulfates, C8-C18-alkyl aryl sulfonic acids, C8-C18 fatty acids, and mixtures thereof.

In one embodiment, the process to fireproof materials according to the invention is characterized in that the concentration of the at least one surfactant of said activation solution is between 0.005% and 0.15% by mass.

In one embodiment, the process to fireproof materials according to the invention is characterized in that the concentration of the at least one surfactant of said activation solution is between 0.01% and 0.1% by mass.

In one embodiment, the process to fireproof materials according to the invention is characterized in that the concentration of the at least one surfactant of said activation solution is between 0.025% and 0.075% by mass.

In one embodiment, the process to fireproof materials according to the invention is characterized in that in step w) at least one egg albumin powder is added.

In one embodiment, the process to fireproof materials according to the invention is characterized in that the concentration of the at least one egg albumin powder of said activation solution is between 0.1% and 3% by mass.

In one embodiment, the process to fireproof materials according to the invention is characterized in that the concentration of the at least one egg albumin powder of said activation solution is between 0.2% and 2% by mass.

In one embodiment, the process to fireproof materials according to the invention is characterized in that the concentration of the at least one egg albumin powder of said activation solution is between 0.3% and 1.2% by mass.

In one embodiment, the process to fireproof materials according to the invention is characterized in that the at least one egg albumin powder is a protein fraction extracted from the rich deglycosylated egg albumin at 80%.

For example, egg albumin powder is an EAP-HWI powder (EGG ALBUMEN POWDER-HIGH WHIP INSTANT).

The addition of egg albumin powder makes it possible to obtain a viscoelastic suspension having a lower density, which is particularly advantageous for carrying out the flame retardant process of this invention.

In one embodiment, the process to fireproof materials according to the invention is characterized in that the density of the viscoelastic suspension brought into contact with said material is between 250 and 2000 kg/m3.

In one embodiment, the process to fireproof materials according to the invention is characterized in that the density of the viscoelastic suspension brought into contact with said material is between 500 and 1500 kg/m3.

In one embodiment, the process to fireproof materials according to the invention is characterized in that the density of the viscoelastic suspension brought into contact with said material is between 800 and 1000 kg/m3.

In one embodiment, the process to fireproof materials according to the invention is characterized in that the concentration of water of said activation solution is between 50% and 85% by mass.

In one embodiment, the process to fireproof materials according to the invention is characterized in that the concentration of water of said activation solution is between 55% and 80% by mass.

In one embodiment, the process to fireproof materials according to the invention is characterized in that the concentration of water of said activation solution is between 60% and 75% by mass.

In one embodiment, the process to fireproof materials according to the invention is characterized in that the $H_2O/M_2O$ ratio of said activation solution is between 6 and 16.

In one embodiment, the process to fireproof materials according to the invention is characterized in that the $H_2O/M_2O$ ratio of said activation solution is between 8 and 14.

In one embodiment, the process to fireproof materials according to the invention is characterized in that the $H_2O/M_2O$ ratio of said activation solution is between 10 and 12.

In one embodiment, the process to fireproof materials according to the invention is characterized in that the molar concentration of hydroxide ions in said activation solution is between 3 and 8 M.

In one embodiment, the process to fireproof materials according to the invention is characterized in that the molar concentration of hydroxide ions in said activation solution is between 4 and 7 M.

In one embodiment, the process to fireproof materials according to the invention is characterized in that the molar concentration of hydroxide ions in said activation solution is between 5 and 6 M.

The use of an activation solution having a molar concentration of hydroxide ions lower than the average of the commonly used activation solutions, makes it possible to dissolve or chemically attack the reasonably operational pozzolanic material on a construction site (short times)

while setting a reasonably acceptable level of alkalinity in terms of safety and health. This also makes it possible to control the hygroscopic characteristics of the solution; the formation of salts and carbonates is greatly reduced.

In one embodiment, the process to fireproof materials according to the invention is characterized in that the Si/AI molar ratio of said activation solution is between 0.5 and 4.

In one embodiment, the process to fireproof materials according to the invention is characterized in that the Si/AI molar ratio of said activation solution is between 0.75 and 3.5.

In one embodiment, the process to fireproof materials according to the invention is characterized in that the Si/AI molar ratio of said activation solution is between 1 and 3. In one embodiment, the process to fireproof materials according to the invention is characterized in that in step y), the pozzolanic material is metakaolin.

In one embodiment, the process to fireproof materials according to the invention is characterized in that in step z), the $Al_2O_3/M_2O$ ratio of said viscoelastic suspension is between 0.7 and 1.3.

In one embodiment, the process to fireproof materials according to the invention is characterized in that in step z), the $Al_2O_3/M_2O$ ratio of said viscoelastic suspension is between 0.8 and 1.2.

In one embodiment, the process to fireproof materials according to the invention is characterized in that in step z), the $Al_2O_3/M_2O$ ratio of said viscoelastic suspension is between 0.9 and 1.1.

Ideally, the $Al_2O_3/M_2O$ ratio of said viscoelastic suspension is equal to 1.

The invention also relates to a fireproof polyurethane foam obtained by impregnation according to the process of the invention.

In one embodiment, said fireproof polyurethane foam obtained by impregnation according to the process of the invention is characterized in that it comprises a geopolymer content between 5 and 60 $Kg/m^3$.

In one embodiment, said fireproof polyurethane foam obtained by impregnation according to the process of the invention is characterized in that it comprises a geopolymer content between 10 and 50 $Kg/m^3$.

In one embodiment, said fireproof polyurethane foam obtained by impregnation according to the process of the invention is characterized in that it comprises a geopolymer content between 20 and 40 $Kg/m^3$.

The invention also relates to a fireproof chipboard obtained by mixing according to the process of the invention.

The term, "agglomerate", is understood to mean an artificial construction material of regular geometric shape, resulting from the setting and hardening of a mixture of a binder and inert materials.

In one embodiment, the fireproof agglomerate obtained by mixing according to the process of the invention is characterized in that it comprises a geopolymer content between 30 and 130 $Kg/m^3$.

In one embodiment, the fireproof agglomerate obtained by mixing according to the process of the invention is characterized in that it comprises a geopolymer content between 50 and 100 $Kg/m^3$.

In one embodiment, the fireproof agglomerate obtained by mixing according to the process of the invention is characterized in that it comprises a geopolymer content between 60 and 90 $Kg/m^3$.

The invention also relates to a fireproof composite material obtained by coating according to the process of the invention.

The term, "composite material", is understood to mean a material formed from several elementary components the association of which confers properties upon all of them, that none of the components possess when taken separately.

In one embodiment, the fireproof composite material obtained by coating according to the process of the invention is characterized in that it comprises a geopolymer gram weight of between 500 and 1500 $g/m^2$.

In one embodiment, the fireproof composite material obtained by coating according to the process of the invention is characterized in that it comprises a geopolymer gram weight of between 700 and 1000 $g/m^2$.

In one embodiment, the fireproof composite material obtained by coating according to the process of the invention is characterized in that it comprises a geopolymer gram weight of between 800 and 900 $g/m^2$.

The invention also relates to a fireproof chipboard obtained by mixing according to the process of the invention.

The term, "chipboard", is understood to mean any element likely to be used for the manufacture of a building, for example a panel, a beam, a brick, etc.

The invention also relates to a geopolymer comprising:

from 80% to 98% by mass of polymerized pozzolanic material;

from 1% to 7% by mass of hydrophobic agent;

from 0.005% to 0.15% by mass of surfactant;

characterized in that it has an Si/AI ratio between 1 and 3.

EXAMPLES

Example 1: Formulations of Viscoelastic Suspensions

TABLE 1

Formulation of a viscoelastic suspension from a 100% Na based activation solution.

| | | Components | % of dry materials |
|---|---|---|---|
| Pozzolanic Material | 1 | Metakaolin | 31.75 |
| Activation | 2A | Sodium Hydroxide | 5.67 |
| Solution | 2B | Sodium Silicate | 13.38 |
| Other | 3 | Hydrophobic Agent Potassium | 3.54 |
| Components | | Methyl Silicone Silres BS16 | |
| | 4 | Anionic Surfactants Empicol XHL-300 | 0.033 |
| | | EAU Total | 45.63% |

TABLE 2

Formulation of a viscoelastic suspension from a K based activation solution.

| | | Components | % of dry materials |
|---|---|---|---|
| Pozzolanic Material | 1 | Metakaolin | 33.6% |
| Activation | 2A | Potassium Hydroxide | 7.18 |
| Solution | 2B | Sodium Silicate | |
| | 2C | Potassium Silicate | 5.19 |
| Other | 3 | Hydrophobic Agent Potassium | 7.34 |

TABLE 2-continued

Formulation of a viscoelastic suspension from a K based activation solution.

| | Components | % of dry materials |
|---|---|---|
| Components | Methyl Silicone Silres BS16 | |
| 4 | Anionic Surfactants Empicol XHL-300 | 3.51 |
| | | 0.035 |
| | EAU Total | 43.15% |

Example 2: Example of Manufacturing a Viscoelastic Suspension According to the Invention In a dispenser equipped with a deflocculating wheel with a diameter of 55 mm, the following are introduced while agitating at 300 rpm:

7.5M alkaline potassium hydroxide solution;

potassium and sodium silicates;

Silres BS16 potassium methyl siliconate;

Empicol XHL-300 surfactant.

Metakaolin is sprinkled into this composition to obtain a viscoelastic suspension.

The viscoelastic suspension is mixed at a speed of 1600 rpm for about 40 minutes.

Preferably, with gentle agitation at 300 rpm, the viscoelastic suspension is cooled to a temperature of about 20° C.

Example 3: Fireproof Bonded Wood Chip Agglomerate According to the Invention

Density of viscoelastic suspension used: 1500 Kg/m$^3$.

Geopolymer content present in the agglomerate after drying: 70.6 Kg/m$^3$.

Procedure: The wood chips are poured into a bowl of a Kenwood mixer, under rotary mixing, (engine running at low speed), the water is added as a spray then the viscoelastic suspension is gradually added at the end of the stream so that the distribution of liquids is as uniform as possible.

A small amount of the mass of wood chips is poured into a beaker and the entire amount is squeezed by means of nesting another beaker within the first.

Fire Test: A pellet of wood chips pressed and bound as described above to a thickness of 3 cm and a diameter of 9 cm. The tip of the torch flame was placed and centered upon the pellet.

Very slow combustion was observed by pyrolysis without flames and without visible smoke. There was no free combustion with flame, nor flame propagation when the torch flame was applied to the pellet. No combustion smoke was observed.

Readings with an IR pyrometer on the back of the pellet stabilized at around 60° C., the front being subjected to the flame.

TABLE 3

Monitoring the temperature on the back of a pellet according to Example 3, based on time.

| Minutes | T° C. (back) | T° C. (front) |
|---|---|---|
| 15 | 56 | Between 500 and 1000 |
| 20 | 59 | Between 500 and 1000 |
| 25 | 59-60 | Between 500 and 1000 |
| 30 | 59-60 | Between 500 and 1000 |
| 35 | 59-60 | Between 500 and 1000 |
| | Flame Arrest | |
| 36 | 59-60 | 250 |
| 45 | 59-60 | 175 |

Example 4: Fireproof Polyurethane Foam According to the Invention

Density of viscoelastic suspension used: 1500 Kg/m$^3$.

Geopolymer content present in the polyurethane foam after drying: 31 Kg/m$^3$.

Untreated polyurethane foams were impregnated with a viscoelastic suspension and left to dry for a week at room temperature.

The foams were impregnated by dipping directly into a paint pan containing the viscoelastic suspension, then the excess was removed by crushing the polyurethane foams.

After drying, a fire test was carried out by setting the treated foam as well as the untreated foam on fire.

For untreated polyurethane foam, combustion was observed with the formation of flames, droplets and smoke.

For the polyurethane foam treated with a binder according to the invention, no combustion of the foam was observed, nor any release of smoke.

Example 5: Fireproof Composite Material According to the Invention

Density of viscoelastic suspension used: 1500 Kg/m$^3$.

Geopolymer gram weight present in the composite material after drying: 840 g/m$^2$.

A viscoelastic suspension was used in order to form a more mechanically resistant composite with fireproof properties.

Fiberglass was applied between two layers of viscoelastic suspension.

The composite thus manufactured may be used in the form of panels for formwork of power grids, thus providing protection against vandalism as well as against fires.

Example 6: Fireproofing of a Material by Coating with a Viscoelastic Suspension Density of viscoelastic suspension used: 1500 Kg/m$^3$.

Geopolymer gram weight after drying: 297.2 g/m$^2$

A viscoelastic suspension is applied with a brush on wooden planks (1 layer or 2 layers).

A fire test is then carried out after drying the viscoelastic suspension. Plates coated with the viscoelastic suspension as well as an uncoated plate were set on fire.

Results:

Neutral wood panel after burning for 5 min. The wood cracked under the heat, when the torch went out, a flame continued to burn for a few seconds.

Wood panel with 1 layer of viscoelastic suspension coating after combustion for 5 min. The wood cracked under the heat, when the torch went out, no flames were observed.

Wood panel with 2 layers of viscoelastic suspension coating after combustion for 5 min. Only the surface was damaged, no cracking of the wood or flames were observed.

Example 7: Fireproofing of Bio-Sourced Materials According to the Process of the Invention and Comparison with Untreated Materials or Having Undergone Chemical Anti-Fire Treatments Cellulose wadding was coated with viscoelastic suspension and then allowed to dry. It is then subjected to combustion by the flame of a torch for 180 seconds. When the torch was stopped, no flames were observed.

Cellulose wadding that had undergone a chemical anti-fire treatment (5% boron salts) was subjected to combustion using the flame of a torch for 180 seconds. When the torch was stopped, smoke was observed and the flame spreading continued.

Expanded polystyrene was coated with viscoelastic suspension and then allowed to dry. It was then subjected to combustion using the flame of a torch for 180 seconds. When the torch was stopped, no flames, droplets or smoke were observed, and the material was not damaged during combustion.

A sheep's wool panel was coated with a viscoelastic suspension and then left to dry. It was then subjected to combustion using the flame of a torch for 180 seconds. When the torch was stopped, no flames, droplets or smoke were observed.

An untreated sheep's wool panel is subjected to combustion using the flame of a torch for 180 seconds. When the torch stops, flames are observed as well as the presence of smoke and droplets of polyethylene which had been used for a binder for the wool; the combustion continues.

The invention claimed is:

1. A process for fireproofing materials comprising the steps of:

a) placing a material in contact with a viscoelastic suspension obtained by mixing a pozzolanic material with an alkaline activation solution comprising at least one soluble metal hydroxide, the viscoelastic suspension having a molar concentration of hydroxide ions of between 3 and 8 M;

b) geopolymerizing the viscoelastic suspension; and c) obtaining a fireproofed material comprising a geopolymer.

2. The process for fireproofing materials according to claim 1 characterized in that the concentration of pozzolanic material in the viscoelastic suspension is between 15% and 50% by mass.

3. A process for manufacturing a viscoelastic suspension according to claim 1 characterized in that the $SiO_2/Al_2O_3$ ratio of the viscoelastic suspension is between 2 and 5.

4. The process for fireproofing materials according to claim 1 characterized in that the pozzolanic material is metakaolin.

5. The process for fireproofing materials according to claim 1 characterized in that the concentration of metal hydroxide in the viscoelastic suspension is between 2% and 10% by mass.

6. The process for fireproofing materials according to claim 1 characterized in that the manner of contact is performed by impregnation, mixing, coating or layering.

7. The process for fireproofing materials according to claim 1 characterized in that the material is in the form of blocks, fragments, filaments or fibers, particles, or a combination of them.

8. The process for fireproofing materials according to claim 1 characterized in that the material is an organic material, an inorganic material, or both.

9. The process to fireproof materials according claim 1 characterized in that prior to placing the material in contact with the viscoelastic suspension, manufacturing the viscoelastic suspension by:

w) placing in an aqueous solution, at least one soluble metal hydroxide;

x) agitating the acqueos solution and obtaining an activation solution having a molar concentration of hydroxide ions of between 3 and 8 M;

y) introducing a pozzolanic material into the activation solution;

z) mixing the activation solution with the pozzolanic material and obtaining a viscoelastic suspension.

10. The method of claim 1, wherein the activation solution includes at least one anionic surfactant selected from the group consisting of C8-C18-alkyl sulphates, C8-C18-alkyl ether sulfates, C8-C18-alkyl aryl sulfonic acids, C8-C18 fatty acids, and mixtures thereof.

11. The method of claim 1, wherein the at least one surfactant is present in the viscoelastic suspension in an amount of between 0.005% by mass and 0.15% by mass of the viscoelastic suspension.

12. The method of claim 9, wherein in step w) at least one egg albumin powder is added to the activation solution.

13. The method of claim 12, wherein a concentration of the at least one egg albumin powder in said activation solution is between 0.1% by mass and 3% by mass of the activation solution.

14. The method of claim 12, wherein the fireproofed material is coated with the geopolymer.

15. A fireproof polyurethane foam obtained by the process according to claim 1, the polyurethane foam comprising a geopolymer.

16. A fireproof agglomerate obtained by the process according to claim 1, the agglomerate comprising a geopolymer.

17. A fireproof composite material obtained by the process according claim 1, the composite material comprising a geopolymer.

18. A fireproof chipboard obtained by the process according to claim 1, the chipboard comprising a geopolymer.

* * * * *